(12) United States Patent
Zhang et al.

(10) Patent No.: US 8,692,796 B2
(45) Date of Patent: Apr. 8, 2014

(54) TOUCH SCREEN AND ADDRESSING METHOD THEREOF

(75) Inventors: Zhiqin Zhang, Beijing (CN); Feng Bai, Beijing (CN)

(73) Assignees: BOE Technology Group Co., Ltd., Beijing (CN); Chengdu BOE Optoelectronics Technology Co., Ltd., Chengdu, Sichuan Province (CN)

( * ) Notice: Subject to any disclaimer, the term of this patent is extended or adjusted under 35 U.S.C. 154(b) by 150 days.

(21) Appl. No.: 13/242,115

(22) Filed: Sep. 23, 2011

(65) Prior Publication Data
US 2012/0075244 A1  Mar. 29, 2012

(30) Foreign Application Priority Data

Sep. 29, 2010 (CN) .......................... 2010 2 0551807 U

(51) Int. Cl.
*G06F 3/045* (2006.01)

(52) U.S. Cl.
USPC .......................................................... 345/174

(58) Field of Classification Search
None
See application file for complete search history.

(56) References Cited

U.S. PATENT DOCUMENTS

2005/0001811 A1* 1/2005 Chiang et al. ................. 345/107

* cited by examiner

*Primary Examiner* — Joe H Cheng
*Assistant Examiner* — Kwin Xie
(74) *Attorney, Agent, or Firm* — Ladas & Parry LLP

(57) ABSTRACT

The disclosed technology provides a touch screen, comprising a touch screen body, comprising a plurality of first channels extending in first direction and a plurality of second channels extending in second direction; and an interface device provided with a plurality of I/O ports, wherein at least two first channels of the touch screen body spaced apart with first predetermined distance are connected electrically to a parallel connection node so as to form a first channel group, and the parallel connection node is connected electrically to one I/O port, and wherein the first predetermined distance is a predetermined length of a touching region in the first direction. An addressing method for the touch screen is also provided.

10 Claims, 8 Drawing Sheets

TOUCH SCREEN AND ADDRESSING METHOD THEREOF

BACKGROUND

Embodiments of the disclosed technology relate to a touch screen and an addressing method thereof.

The configuration of a typical capacitive touch screen mainly includes a transparent thin film conductor layer plated on a glass screen (substrate) and a piece of protective glass disposed on the conductor layer.

The capacitive touch screen is provided with slim electrodes, which are plated at each of the four sides of the screen for forming a low-voltage alternating current (AC) field in the conductor layer. When the screen is touched by one finger of a user, a coupling capacitor will be formed between the finger and the conductor layer due to the field of human body, and a current flows from the electrodes at the four sides toward the touch point. Since the current intensity is proportional to a distance from the finger to the electrodes, a controller disposed at backside of the touch screen can calculate the proportion and the intensity of current and thus determine the position of the touch point exactly.

The conventional capacitive touch screen comprises channels and I/O ports corresponding to the channels in amount, and the channels are connected with respective I/O ports of an IC (Integrated Circuit) board, as shown in FIG. 1. In FIG. 1, the reference numeral 1 denotes lateral channels, the reference numeral 2 denotes longitudinal channels, the reference numeral 3 denotes an IC board, and the reference numeral 31 denote I/O ports of the IC board.

When the touch screen has a larger dimension, more channels are required, thus it is necessary to choose the IC board with more I/O ports, resulting in an increasing of cost of the IC board.

SUMMARY

An embodiment of the disclosed technology provides a touch screen, comprising: a touch screen body comprising a plurality of first channels extending in a first direction and a plurality of second channels extending in a second direction; and an interface device provided with a plurality of I/O ports, wherein at least two first channels of the touch screen body spaced apart at a first predetermined distance are connected electrically to a parallel connection node so as to form a first channel group, and the parallel connection node is connected electrically to one I/O port of the interface device, and wherein the first predetermined distance is a predetermined length of a touching region in the first direction.

Another embodiment of the disclosed technology provides an electronic product comprising the touch screen as described above.

Another embodiment of the disclosed technology provides an addressing method for the touch screen as described above, comprising: detecting the first channels adjacent to the at least two first channels in the group when a touch signal is detected on the first channel, and determining the first channel in the group, the first channel adjacent to which has a detected touching signal, as the touched first channel.

Further scope of applicability of the disclosed technology will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Hereinafter, the embodiments of the invention will be described in detail with reference to the accompanying drawings so that the objects, technical solutions and advantages of the embodiments of the invention will become more apparent. It should be noted that the embodiments described below merely are a portion of but not all of the embodiments of the invention, and thus various modifications, combinations and alterations may be made on basis of the described embodiments without departing from the spirit and scope of the invention.

Figure 1:
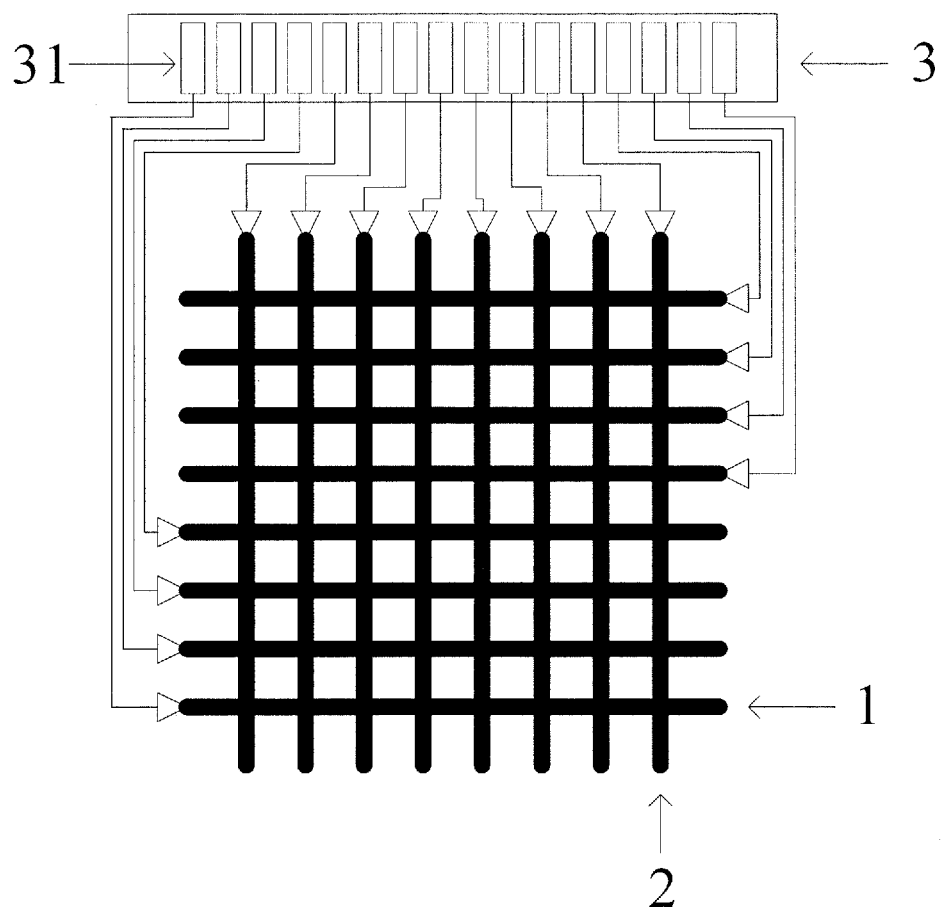
FIG. 1 is a schematic diagram showing a connection between channels of the touch screen and I/O ports of the IC board in the related arts.
Figure 2:
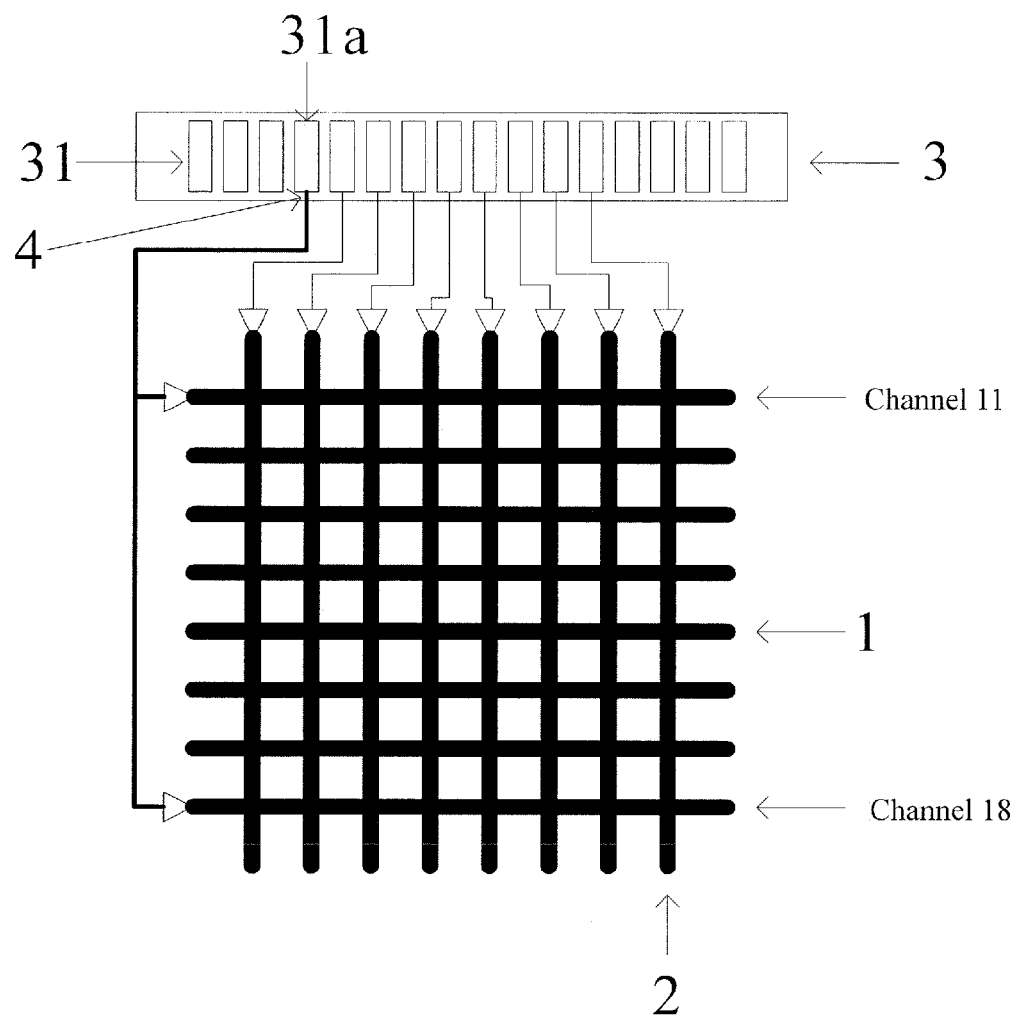
FIG. 2 is a schematic diagram showing a connection between channels of the touch screen and I/O ports of the IC board according to a embodiment of the disclosed technology.

An embodiment of the disclosed technology provides a touch screen, comprising a touch screen body and an interface device, as shown in FIG. 2. The touch screen body comprises a plurality of lateral channels 1 and a plurality of longitudinal channels 2; and an interface device, such as an IC board 3, is provided with a plurality of I/O ports 31 for the channels described above. The touch screen is formed by e.g., multi-circuit layers formed on the glass substrate.

The following description takes the lateral channels of the capacitive touch screen for example. As shown in FIG. 2, the uppermost lateral (line) channel 11 and the lowest lateral channel 18 of the touch screen body are connected electrically such that a parallel connection node 4 is obtained. The parallel connection node 4 is connected electrically to one I/O port 31a of the IC board 3, thus both of the lateral channel 11 and the lateral channel 18 are connected to the same I/O port

31a. Although only eight lateral channels are shown in the drawing, the disclosed technology is not limited to the particular amount.

In this embodiment, the channel 11 is spaced apart from the channel 18 by a predetermined distance L which is set as a longitudinal length (or distance) of a touching region obtained when a common user's finger touches the touch screen. In other words, the spacing between the channels 11 and 18 greater than the predetermined distance L can insure the accuracy for determining a touch point. The embodiment of the disclosed technology does not intend to limit the channels 11 and 18 to be the first and last ones, as long as they meet the above conditions.

Figure 3A:
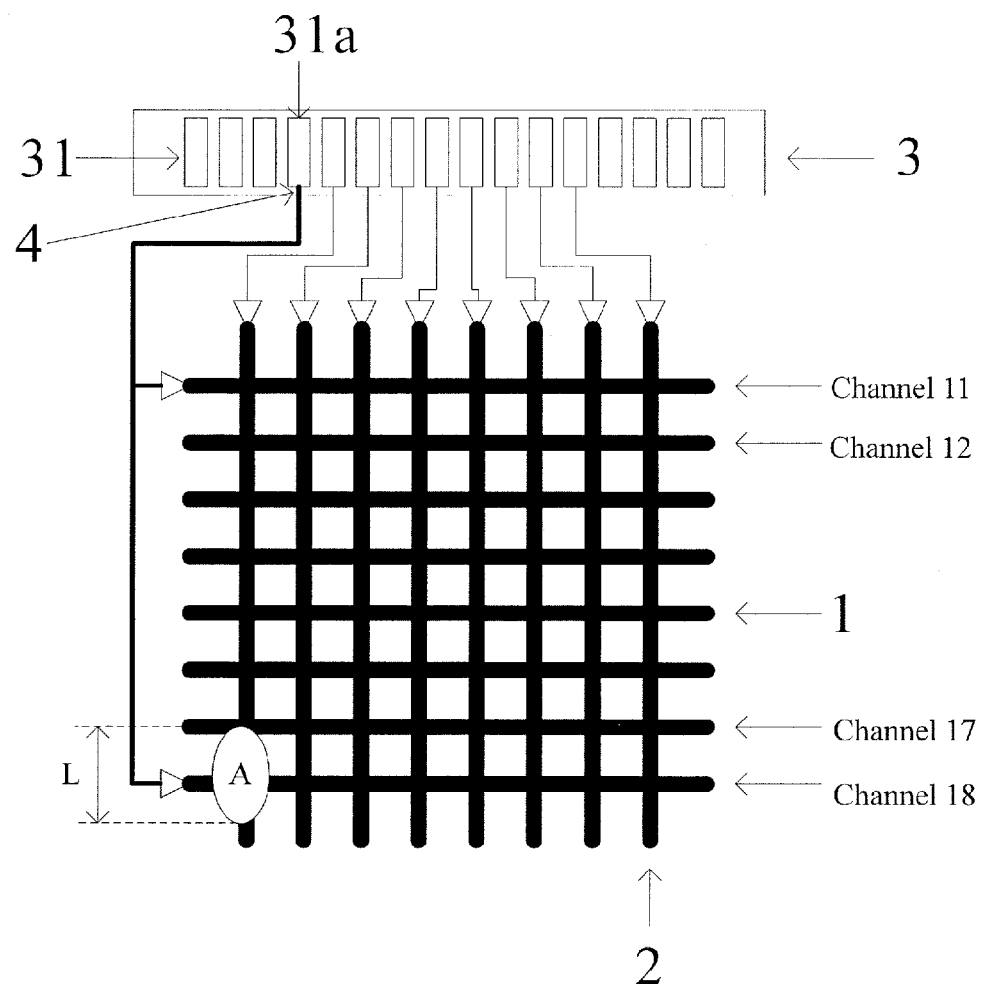
FIGS. 3A to 3B are schematic diagrams showing a connection between channels of the touch screen and I/O ports of the IC board according to another embodiment of the disclosed technology.

As shown in FIG. 3A, when a point A on the touch screen is touched by a user's finger, the channel 18 is covered by the most part of the touching region. Since the channels 11 and 18 are connected together and with the same I/O port 31a, the channels 11 and 18 have the signals of same strength for the controller on the IC board at the moment. On the other hand, since the channel 17 is also approached or covered partly by the finger touching the point A, there is a signal of partial intensity on the channel 17, but no signal presents on the channel 12 adjacent to the channel 11. In this case, the channel 12 does not carry any noise signal or share a same I/O port 31 with the channel 17. In the example, the spacing between the channels 17 and 18 is less than the above predetermined distance L, and thus it is possible to detect a strong signal on the I/O port 31 corresponding to the channel 17.

In summary, the channels 18 and 11 have signals with the same intensity. There is a signal of partial intensity on the channel 17 adjacent to the channel 18. No signal presents on the channel 12 adjacent to the channel 11. Therefore, it can be determined apparently that the user's finger touches the channel 18 rather than channel 11. In addition, in the configuration of this embodiment, the spacing between the channels 18 and 11 connected together is greater than the longitudinal length of the touching region for the user's finger. At the moment, which channel is touched in two channels connected in parallel can be determined by detecting signals over all channels adjacent to the channels connected in parallel and with the detected signal.

Figure 3B:
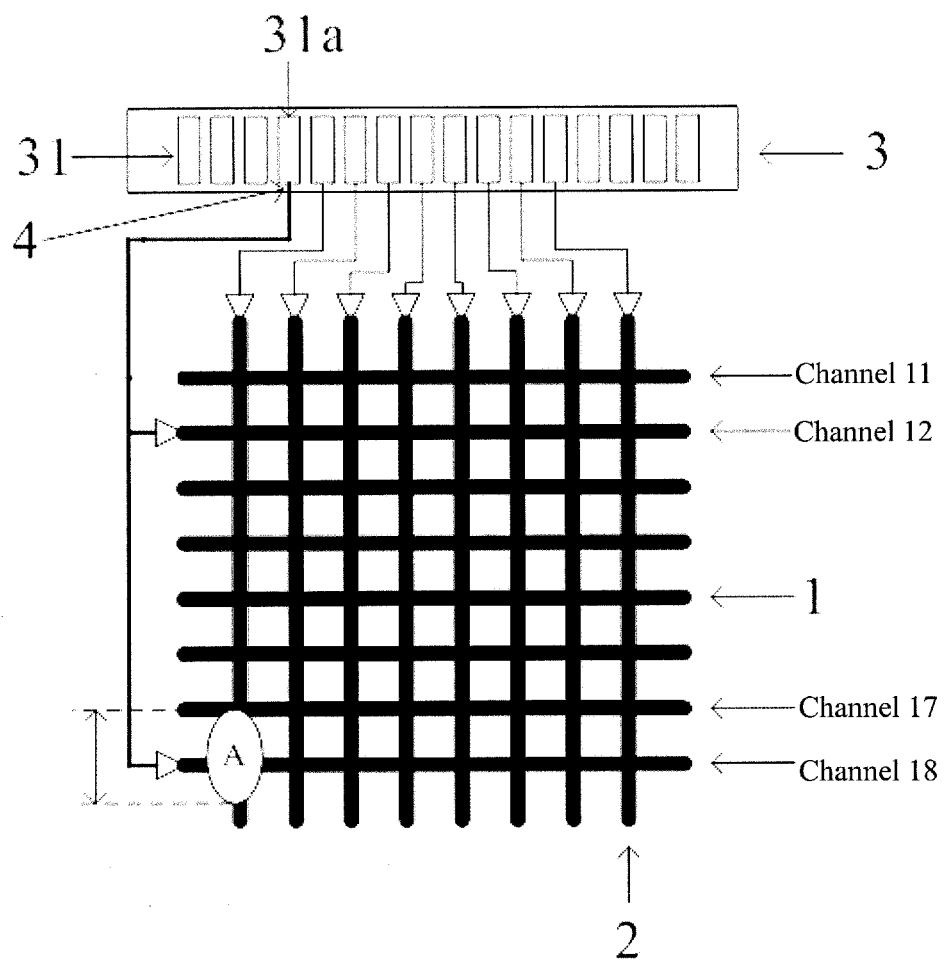

In another embodiment, as shown in FIG. 3B, the lateral channels 12 and 18 of the touch screen body are connected electrically such that a parallel connection node 4 is obtained. The channel 12 is spaced apart from the channel 18 by at least a predetermined distance L. Since the channel 17 located above and adjacent to the channel 18 is covered partly by the touching region when the channel 18 is touched, there is a signal of partial intensity on the channel 17, while no signal presents on the channel 11 which is located above and adjacent to the channel 12 connected in parallel to the channel 18. Thereby, it can be determined that the channel 18 is touched. In this embodiment, which channel is touched in the channels connected in parallel can be determined by detecting signals on the channels on the same side adjacent to the channels connected in parallel and with the detected signal.

In the touch screen according to this embodiment of the disclosed technology, by taking the lateral channels for example, two channels are connected in parallel and then connected to one I/O port of the IC board. One I/O port correspondingly can control more than one channel, compared with one channel corresponding to one I/O port in the related arts. In this way, less I/O ports are needed to control the same channels, and also a larger touch screen with more channels can be implemented without increasing the amount of the I/O ports of the IC board, reducing cost of the IC board.

In addition, since the spacing between the two connected lateral channels is greater than the longitudinal length of the touching region, different combinations of signals can be obtained on the channels connected in parallel and the adjacent channels adjacent to them. As a result, the actual position of the touching region can be determined exactly without affecting the accuracy of the touch screen.

Figure 4:
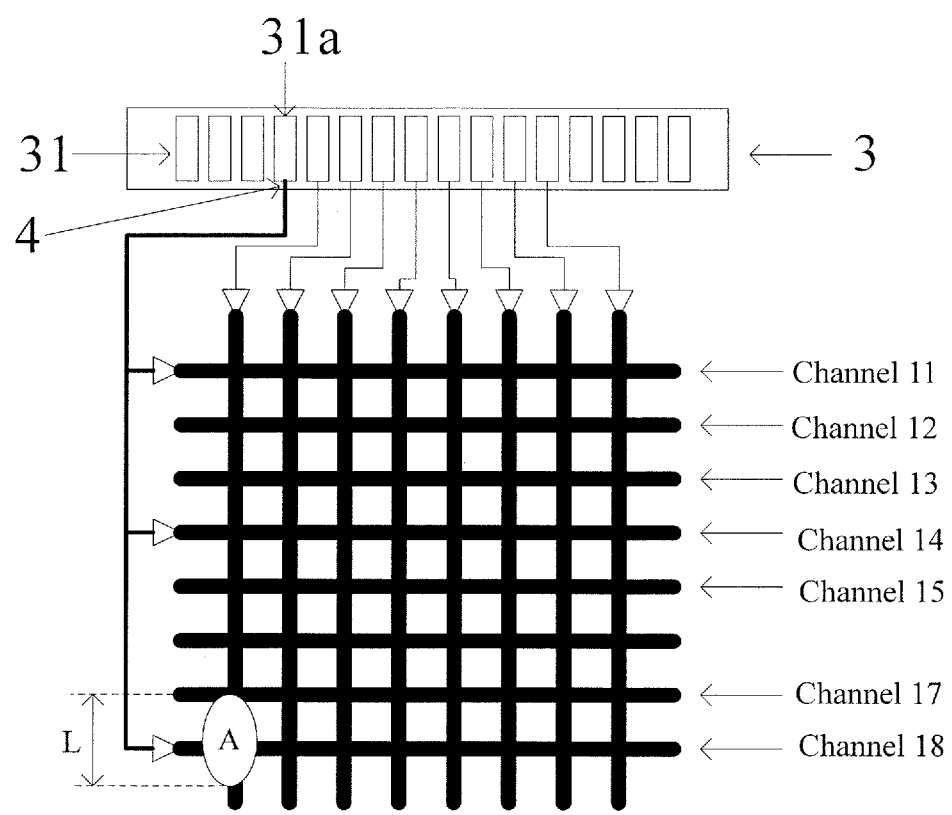
FIG. 4 is a schematic diagram showing a connection between channels of the touch screen and I/O ports of the IC board according to further embodiment of the disclosed technology.

In another touch screen according to embodiments of the disclosed technology, similarly the lateral channels of the capacitive touch screen are taken for example. In the previous embodiment, although two lateral channels are connected electrically, a plurality of channels can be connected electrically, as shown in FIG. 4. It is assumed in this embodiment that three lateral channels 11, 14 and 18 are connected electrically so that a parallel connection node 4 is obtained. The parallel connection node 4 is connected electrically to one I/O port 31a of the IC board 3. That is, the channels 11, 14 and 18 are connected to the same I/O port 31a.

In this embodiment, the spacing between any two of the connected channels 11, 14 and 18 is greater than the predetermined distance L. Similarly, the predetermined distance L in this embodiment is set as a longitudinal length of a touching region when a common user's finger touches the touch screen, i.e., the longitudinal length L of the touching region when the finger touches a point A. In other words, only when the spacing between the channels 11 and 14 is greater than the predetermined distance L, and the spacing between the channels 14 and 18 is greater than the predetermined distance L, the accuracy for determining a touch point can be ensured.

Similarly, when the point A on the touch screen is touched by the use's finger, signals with the same intensity are produced on the channels 18, 14 and 11 which are connected together. A signal of certain intensity is produced on the channel 17 adjacent to the channel 18, no signal is produced on the channel 12 adjacent to the channel 11, and no signal is produced on the channels 13 and 15 adjacent to the channel 14, thus it is possible to determine exactly that the use's finger touches the channel 18, rather than the channel 11 or 14. One of the channels 12, 13 and 15 does not share one I/O port 31 with the channel 17 at the moment.

Certainly, with increasing of the dimension of the touch screen and thus increasing of the amount of the channels, more channels with spacing greater than the predetermined distance L can be further connected together for purpose of sharing I/O ports of the IC board and in turn the cost of the IC board can be saved.

Further another touch screen according to an embodiment of the disclosed technology is provided, and lateral channels of the capacitive touch screen are taken for example. Lateral channels are grouped and in each group connected together electrically, as shown in FIG. 5.

Figure 5:
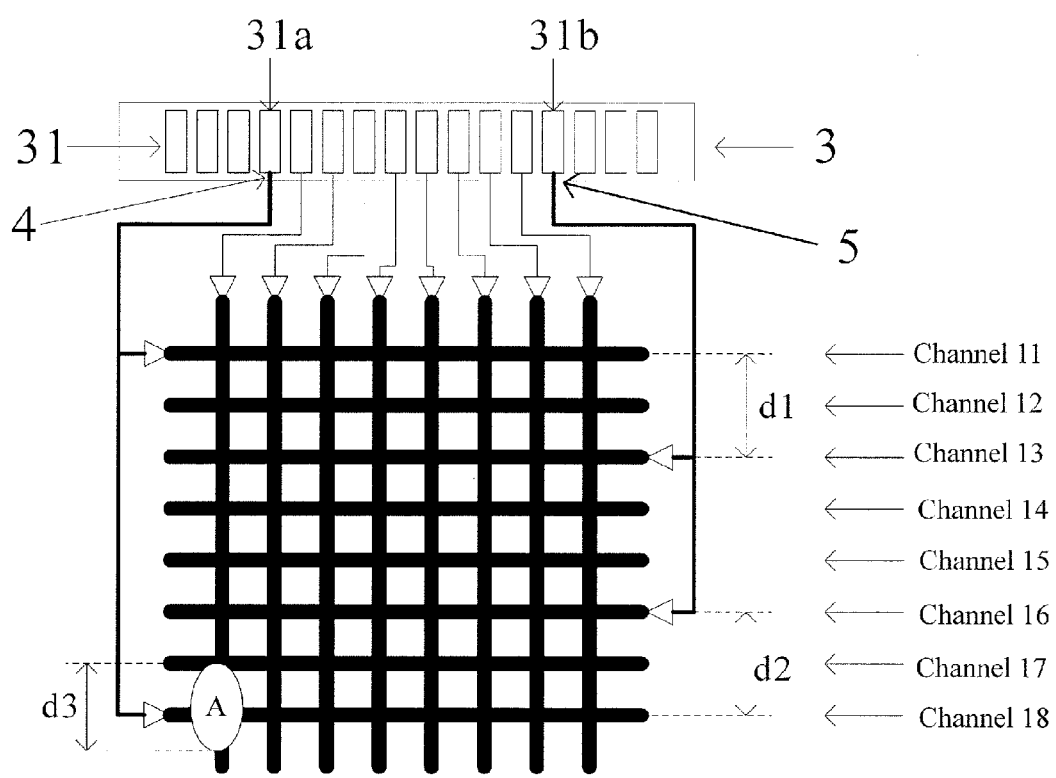
FIG. 5 is a schematic diagram showing a connection between channels of the touch screen and I/O ports of the IC board according to further another embodiment of the disclosed technology.

In FIG. 5, the uppermost lateral channel 11 and the lowest lateral channel 18 of the touch screen body are connected electrically such that a parallel connection node 4 is obtained. The parallel connection node 4 is connected electrically to one I/O port 31a of the IC board 3 and the spacing between the channels 11 and 18 is greater than a predetermined distance L. In this embodiment, the predetermined distance L is set as the longitudinal length of the touching region when a common user's finger presses the touch screen, such as the distance d3 as shown in the figure.

In addition, the lateral channel 13 and 16 of the touch screen body are connected electrically such that a parallel connection node 5 is obtained. The parallel connection node 5 is connected electrically to one I/O port 31b of the IC board 3 and the spacing between the channels 13 and 16 is greater than a predetermined distance L. In this embodiment, the predetermined distance L is set as the longitudinal length of the touching region when a common user's finger presses the touch screen, such as the distance d3 as shown in the figure.

In the case where channels in each group are connected together, the following relationship must be satisfied between the groups: if the spacing between two closest lateral channels in any two groups is less than the predetermined distance L, the spacing between other lateral channels in the two groups is greater than the predetermined distance L. In this way, it is possible to insure the accuracy for determining the touching region.

In this embodiment, the distance d1 between the channel 13 and the channel 11 is equal to the distance d2 between the channel 16 and the channel 18, and the distances d1 and d2 are greater than the predetermined distance L (e.g., d3).

When a point A on the touch screen is touched by the user's finger, the channel 18 is covered by the most part of the touching region. Since the channels 11 and 18 are connected together, the channels 11 and 18 have the signals of the same strength. On the other hand, since the channel 17 is also covered partly when the finger touches the point A, there is a signal of partial intensity on the channel 17, but there is no signal on the channel 12 adjacent to the channel 11. Since the channels 13 and 16 are not touched, no signal is produced thereon. As a result, it can be determined exactly that the touching region is located on the channel 18. In another case, if the channels 17 and 18 have substantively the same intensity signals, one of the channels is selected according to a predetermined rule, e.g., the channel with a smaller numeral is selected according to the rule, or vice versa.

In still further another touch screen according to an embodiment of the disclosed technology, lateral channels of the capacitive touch screen are taken for example. Lateral channels are grouped and in each group connected together electrically, as shown in FIG. 6.

Figure 6:
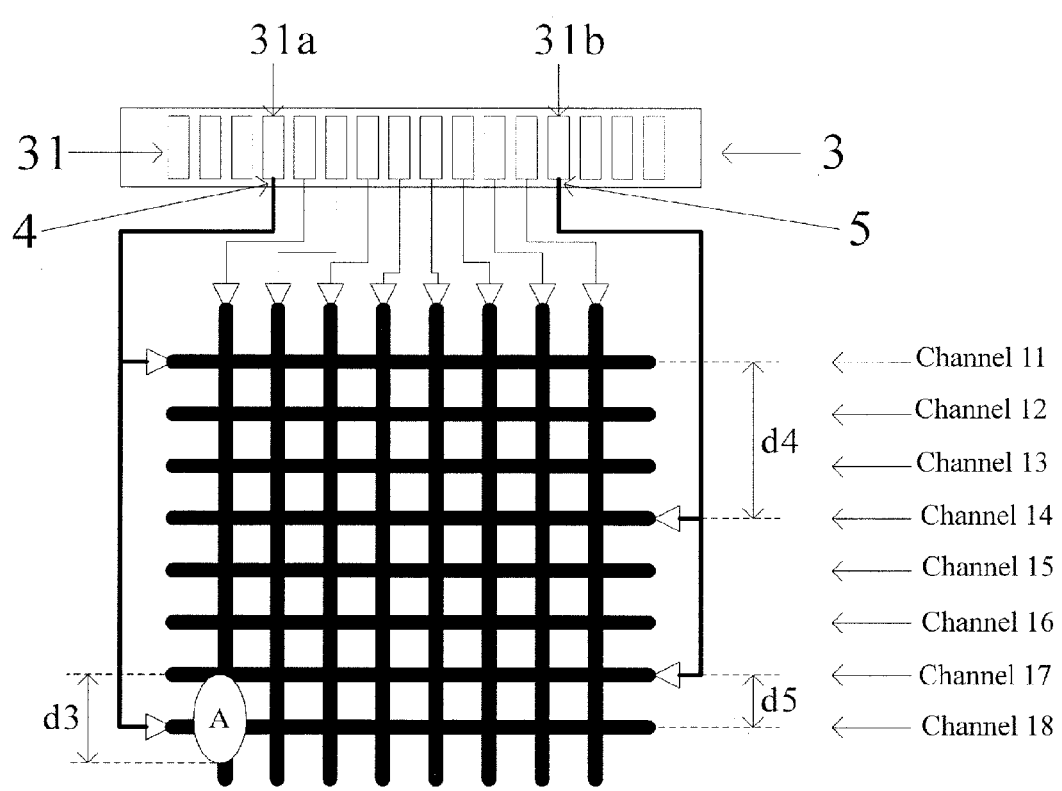
FIG. 6 is a schematic diagram showing a connection between channels of the touch screen and I/O ports of the IC board according to a embodiment of the disclosed technology.

In FIG. 6, the uppermost lateral channel 11 and the lowest lateral channel 18 of the touch screen body are connected electrically such that a parallel connection node 4 is obtained. The parallel connection node 4 is connected electrically to one I/O port 31a of the IC board 3 and the spacing between the channels 11 and 18 is greater than a predetermined distance L. In this embodiment, the predetermined distance L is set as the longitudinal length of the touching region when a common user's finger presses the touch screen, such as the distance d3 as shown in the figure.

In addition, the lateral channel 14 and the lateral channel 17 of the touch screen body are connected electrically such that a parallel connection node 5 is obtained. The parallel connection node 5 is connected electrically to one I/O port 31b of the IC board 3 and the spacing between the channels 14 and 17 is greater than a predetermined distance L. In this embodiment, the predetermined distance L is set as the longitudinal length of the touching region when a common user presses the touch screen with a finger, such as the distance d3 as shown in the figure.

In the case where channels in each group are connected together, the following relationship must be satisfied between the groups: if the spacing between two closest lateral channels in any two groups is less than the predetermined distance L, the spacing between other lateral channels in the two groups is greater than the predetermined distance L. In this way, it is possible to ensure the accuracy for determining the touching region.

In this embodiment, the channel 17 in the right group and the channel 18 in the left group are two closest lateral channels with a distance d5 less than the predetermined distance L (e.g., d3), the other lateral channels in the two groups, i.e., the channel 14 in the right group and the channel 11 in the left group have to be spaced apart from each other with a distance d4 greater than the predetermined distance L (e.g., d3). In this way, the accuracy for determining the touching region can be ensured.

As shown in FIG. 6, when a point A is touched by the user's finger, the channel 18 is covered by the most part of the touching region. Since the channels 11 and 18 are connected together, the channels 18 and 11 have the signals of same strength at the moment. On the other hand, since the channel 17 is also covered partly when the finger touches the point A, there is a signal of partial intensity on the channel 17. Since the channel 17 is connected to the channel 14, it seems that there is a signal of partial intensity on the channel 14. However, on the channel 12 adjacent to the channel 11, no signal intensity is produced.

As described above, after touching, strong signals are produced on the channels 18 and 11, a weak signal is produced on the channel 17 adjacent to the channel 18 and on the channel 14, and no signal is produced on the channel 12 adjacent to the channel 11, thus it is possible to determine that the user's finger presses the channel 18, rather than the channel 11.

Certainly, in this embodiment, the amount of the channels connected together in each group is two, but the disclosed technology is not limited. With increasing of the dimension of the touch screen and thus increasing of the amount of the channels, a plurality of channels can be connected in each of the groups, as long as satisfying the following relationship: "if the spacing between the two closest channel in any two groups is less than the predetermined distance L, the spacing between the other lateral channels in the two group should be greater than the predetermined distance L", so as to ensure the accuracy for determining the touching region.

In all the embodiments described above, the lateral channels in capacitive touch screen are taken for example. In application, the longitudinal channels can be connected together in the manner and the relationship both similar to those of the lateral channels, thus the description is omitted here. In addition, the predetermined distance L for the longitudinal channels is a lateral distance W of the touching region. In this embodiment, the predetermined distance can be determined based on the greater one of length and width of the touching region. As a result, it is not necessary to consider the direction of the touch screen.

In the touch screen according to an embodiment of the disclosed technology, a capacitive touch screen is taken for example. The lateral channels and the longitudinal channels are connected respectively, as shown in FIG. 7.

Figure 7:
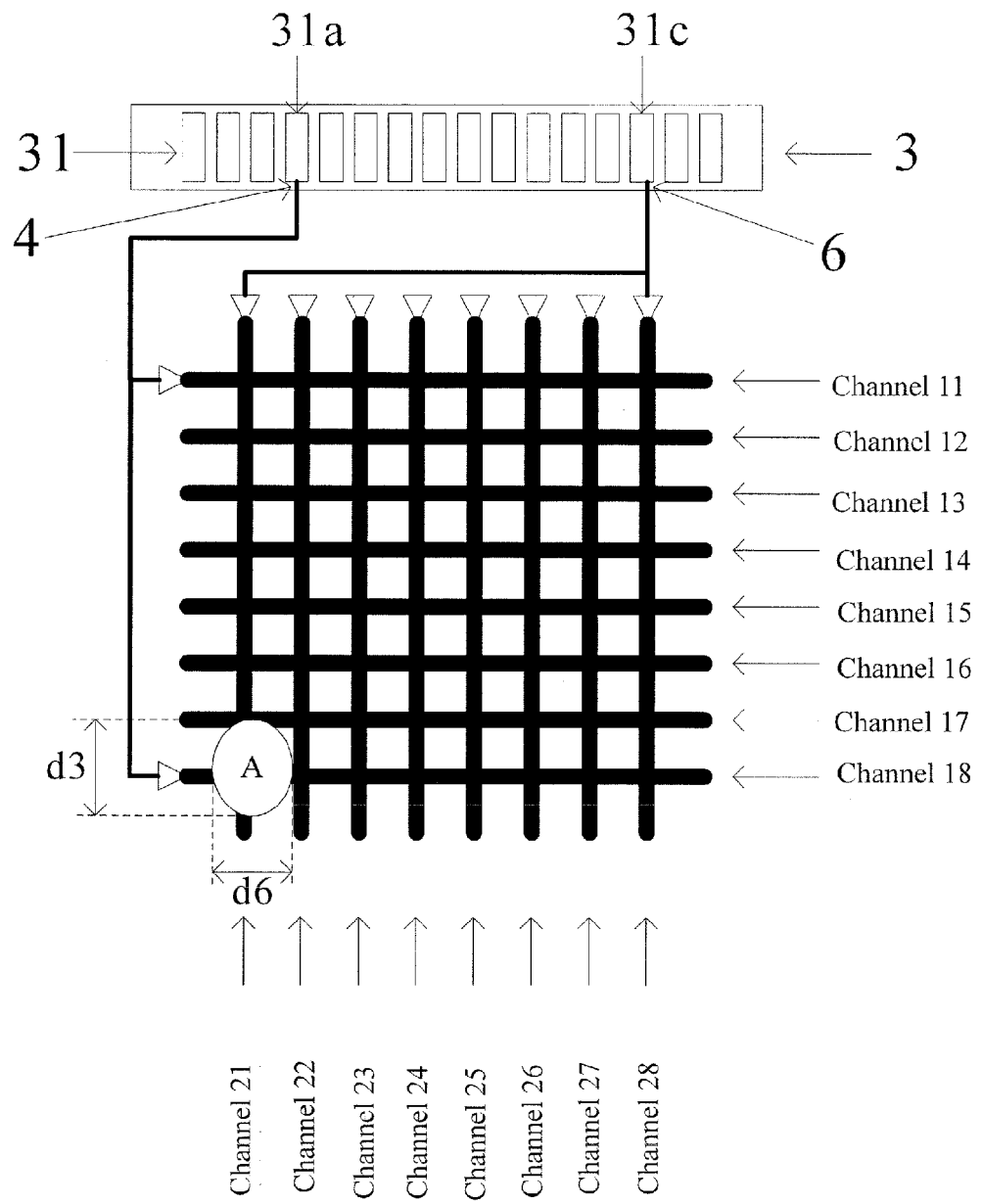
FIG. 7 is a schematic diagram showing a connection between channels of the touch screen and I/O ports of the IC board according to another embodiment of the disclosed technology.

In FIG. 7, the uppermost lateral channel 11 and the lowest lateral channel 18 of the touch screen body are connected electrically such that a parallel connection node 4 is obtained. The parallel connection node 4 is connected electrically to one I/O port 31a of the IC board 3 and the spacing between the channels 11 and 18 is greater than a predetermined distance L. In this embodiment, the predetermined distance L is set as the longitudinal length of the touching region when a common user's finger presses the touch screen, such as the distance d3 as shown in the figure.

In addition, the leftmost lateral channel 21 and the rightmost lateral channel 28 of the touch screen body are connected electrically such that a parallel connection node 6 is obtained. The parallel connection node 6 is connected electrically to one I/O port 31c of the IC board 3 and the spacing between the channels 21 and 28 is greater than a predetermined distance L. In this embodiment, the predetermined distance L is set as the lateral distance of the touching region when a common user's finger presses the touch screen, such as the distance d6 as shown in the figure.

As shown in FIG. 7, when a point A is touched by the user's finger, for the lateral channels, the channel 18 is covered by the most part of the touching region. Since the channels 11 and 18 are connected together, the channels 18 and 11 have the signals of same strength at the moment. On the other hand, since the channel 17 is also covered partly when the finger touches the point A, there is a signal of partial intensity on the channel 17. However, on the channel 12 adjacent to the channel 11, no signal intensity is produced. Therefore, the signals of same strength are produced on the channels 18 and 11, a weak signal is produced on the channel 17 adjacent to the channel 18, and no signal is produced on the channel 12 adjacent to the channel 11, thus it is possible to determine that the touching region is located on the lateral channel 18.

Similarly, for the longitudinal channels, the channel 21 is covered by the most part of the touching region. Since the channels 21 and 28 are connected together, the channels 21 and 28 have the signals of same strength at the moment. On the other hand, since the channel 22 is also covered partly when the finger touches the point A, there is a signal of partial intensity on the channel 22. However, on the channel 27 adjacent to the channel 28, no signal intensity is produced. Therefore, the signals of same strength are produced on the channels 21 and 28, a weak signal is produced on the channel 22 adjacent to the channel 21, and no signal is produced on the channel 27 adjacent to the channel 28, thus it is possible to determine that the touching region is located on the longitudinal channel 21.

With determining the lateral and the longitudinal channels, it is possible to determine exactly the touching region pressed by a finger.

In this embodiment, only one lateral and the longitudinal channel connection group is shown, and there are only two channels in each group, but the disclosed technology is not limited thereto. With increasing of the dimension of the touch screen, the amount of the lateral and the longitudinal channel connection groups may be more, and channels in each group can be connected in a manner and rule both similar to those in the above embodiments.

Furthermore, the touch screen according to an embodiment of the disclosed technology further includes a computing judgment unit for determining the channel where the touching region is located based on the intensity and combinations of the signals on channels. That is, this unit can be adapted to compute for determining the position of the touching region is performed in the above embodiments.

In addition, although a capacitive touch screen is taken for example in each of the embodiments of the disclosed technology for purpose of illustration, the disclosed technology is not limited to thereto, and other type touch screen, such as a resistive touch screen, can be adopted also. In the case of a resistive touch screen, if the touch screen is used with a contact pen or a stylus, a predetermined distance can be determined based on the touching region of the contact pen or stylus.

In the touch screen according to an embodiment of the disclosed technology, at least two channels are connected parallel to each other and then connected to one I/O port of the IC board. It enables one I/O port correspondingly to control more one channel, as compared with one channel corresponding to one I/O port in the related art. In this way, less I/O ports are needed to control the same channels, and also a larger touch screen with more channels can be implemented without increasing the amount of the I/O ports of the IC board, reducing cost of the IC board.

In addition, when there are a plurality of groups in each of which channels are connected together, if the spacing between two closest channels in any two groups is less than the predetermined distance L, the spacing between other channels in the two groups is greater than the predetermined distance L. Then, when the touching region is located on any one of the two channels with a spacing less than the predetermined distance L, the signal combination on the channels connected in parallel is different from each other since the spacing between other sides is greater than the predetermined distance L. Accordingly, the actual position of the touching region can be determined without affecting the accuracy of the touch screen.

The touch screen according to any of the above embodiments can be applied to a variety of electronic products, including but not limit to, cell phone, tablet computer and the like.

Those skilled in the art can understand that all or part of the steps for realizing the method according to any of the above embodiments can be implemented with hardware, software, firmware, or the like in connection with a program. The program is stored in a readable storage medium of a computer. The program performs the steps of the method according to the above embodiments upon running. The storage medium previous described includes ROM, RAM, magnetic disk or compact disc and other medium for storing program codes.

It should be appreciated that the embodiments described above are intended to illustrate but not limit the disclosed technology. Although the disclosed technology has been described in detail herein with reference to the preferred embodiments, it should be understood by those skilled in the art that the disclosed technology can be modified and some of the technical features can be equivalently substituted without departing from the spirit and scope of the disclosed technology.

What is claimed is:

1. A touch screen, comprising:
a touch screen body comprising a plurality of first channels extending in a first direction and a plurality of second channels extending in a second direction; and
an interface device provided with a plurality of I/O ports, wherein at least two first channels of the touch screen body spaced apart at a first predetermined distance are connected electrically to a parallel connection node so as to form a first channel group, and the parallel connection node is connected electrically to one I/O port, and
wherein the first predetermined distance is a longitudinal length of a touching region obtained when a user's finger touches the touching screen body in the first direction.

2. The touch screen according to claim 1, wherein the touch screen body comprising a plurality of first channel groups, and
wherein, when the spacing between two closest first channels in any two groups is less than the first predetermined distance, the spacing between other first channels in the two groups is greater than the first predetermined distance.

3. The touch screen according to claim 1, wherein at least two first channels of the touch screen body spaced apart with second predetermined distance are connected electrically to a parallel connection node so as to form a second channel group, and the parallel connection node is connected electrically to one I/O port, and wherein the second predetermined distance is a lateral length of the touching region obtained when the user's finger touches the touching screen body in the second direction.

4. The touch screen according to claim 3, wherein the touch screen body comprising a plurality of second channel groups, and wherein, when the spacing between two closest second channels in any two groups is less than the second predetermined distance, the spacing between other second channels in the two groups is greater than the second predetermined distance.

5. The touch screen according to claim 1, wherein at least two first channels of the touch screen body spaced apart with first predetermined distance are connected electrically to a parallel connection node so as to form a second channel group and the parallel connection node is connected electrically to one I/O port.

6. The touch screen according to claim 5, wherein the touch screen body comprising a plurality of second channel groups, and wherein, when the spacing between two closest second channels in any two groups is less than the first predetermined distance, the spacing between other second channels in the two groups is greater than the first predetermined distance.

7. The touch screen according to claim 1, further comprising:

a computing judgment unit for determining the channel on which the touching region is located based on signal intensity and signal combination of channels.

8. The touch screen according to claim 1, wherein the touch screen is a capacitive touch screen or a resistive touch screen.

9. An electronic product, comprising the touch screen according to claim 1.

10. An addressing method for the touch screen according to claim 1, comprising:

detecting the first channels adjacent to the at least two first channels in the group when a touch signal is detected on the first channel, and determining the first channel in the group, the first channel adjacent to which has a detected touching signal, as the touched first channel.

\* \* \* \* \*